United States Patent
Waicberg et al.

(10) Patent No.: US 11,393,202 B2
(45) Date of Patent: Jul. 19, 2022

(54) AUGMENTED REALITY SUPPORT PLATFORM

(71) Applicant: CareAR Holdings LLC, Norwalk, CT (US)

(72) Inventors: Samuel Waicberg, Frisco, TX (US); Chetan Gandhi, New York, NY (US)

(73) Assignee: CareAR Holdings LLC, Norwalk, CT (US)

( * ) Notice: Subject to any disclaimer, the term of this patent is extended or adjusted under 35 U.S.C. 154(b) by 0 days.

(21) Appl. No.: 17/187,144

(22) Filed: Feb. 26, 2021

(65) Prior Publication Data

US 2021/0271882 A1 Sep. 2, 2021

Related U.S. Application Data

(60) Provisional application No. 62/983,141, filed on Feb. 28, 2020.

(51) Int. Cl.
*G06T 19/00* (2011.01)
*G06V 20/20* (2022.01)
(Continued)

(52) U.S. Cl.
CPC .............. *G06V 20/20* (2022.01); *G06T 19/00* (2013.01); *G06V 20/35* (2022.01);
(Continued)

(58) Field of Classification Search
CPC ........... G06K 9/00671; G06K 9/00684; G06K 7/1413; G06K 9/6201; G06K 7/1417; G06T 19/00; G06T 2219/004; G06T 2219/024; G06T 7/74; G06T 7/20; G06T 2207/10016; H04L 65/4015; H04L 67/24; G06F 3/04815; G06F 3/167; G06F 3/0488; G06F 3/1454; G06F 3/011; G06F 3/005; G02B 27/0101; G02B 27/0172; G02B 27/017;
(Continued)

(56) References Cited

U.S. PATENT DOCUMENTS 9,100,218 B2 * 8/2015 Green ................... G06F 3/0482
9,886,552 B2 * 2/2018 Dillavou ................ G16H 50/50
(Continued)

*Primary Examiner* — Abderrahim Merouan
(74) *Attorney, Agent, or Firm* — Whitmyer IP Group LLC

(57) ABSTRACT

A method for providing device support to a user using an augmented reality (AR) interface includes establishing, by a computer system, a real-time communication session streaming audio and video between (i) a local application executing on a local user device and (ii) a remote application executing a remote user device. The method further includes transmitting, via the real-time communication session, images depicting equipment captured by the local application. Annotations to the images are received from the remote application. Each annotation is anchored to user-selected positions on the equipment. The annotations are presented on the remote user device overlaid on the equipment at the user-selected positions. The real-time communication session is used to transmit audio or video instructional information related to the equipment and referencing the annotations. The computing system stores a new session record that includes the images, the annotations, and the audio or video instructional information.

20 Claims, 6 Drawing Sheets

(51) Int. Cl.
  *H04L 67/54* (2022.01)
  *H04L 65/401* (2022.01)
  *G06V 20/00* (2022.01)

(52) U.S. Cl.
  CPC .......... *H04L 65/4015* (2013.01); *H04L 67/24* (2013.01); *G06T 2219/004* (2013.01); *G06T 2219/024* (2013.01)

(58) Field of Classification Search
  CPC .... G02B 2027/0187; G02B 2027/0138; H04N 7/147; G06Q 10/20; G06V 20/20; G06V 20/35
  See application file for complete search history.

(56) References Cited

U.S. PATENT DOCUMENTS

| | | | |
|---|---|---|---|
| 10,010,379 B1* | 7/2018 | Gibby | G06F 3/017 |
| 10,607,084 B1* | 3/2020 | Tang | G09B 5/06 |
| 10,798,037 B1* | 10/2020 | Vadayadiyil Raveendran | H04L 51/10 |
| 2002/0184245 A1* | 12/2002 | MacPherson | G06T 17/20 |
| 2009/0141184 A1* | 6/2009 | Gulati | H04N 21/42204 348/734 |
| 2013/0114100 A1* | 5/2013 | Torii | H04N 1/00344 358/1.14 |
| 2016/0026912 A1* | 1/2016 | Falcon | G06N 3/0454 706/25 |
| 2016/0344877 A1* | 11/2016 | Altamirano | H04N 1/00129 |
| 2017/0193461 A1* | 7/2017 | Celinder | G06Q 10/20 |
| 2018/0218538 A1* | 8/2018 | Short | G02B 27/017 |
| 2019/0130629 A1* | 5/2019 | Chand | H04L 65/1069 |
| 2019/0250873 A1* | 8/2019 | Blume | G06F 3/011 |
| 2019/0370544 A1* | 12/2019 | Wright, Jr. | G06F 3/0488 |
| 2020/0058169 A1* | 2/2020 | Friesenhahn | G06T 19/006 |
| 2020/0258315 A1* | 8/2020 | Li | G02B 27/017 |
| 2020/0334877 A1* | 10/2020 | Pokorny | G06F 3/011 |
| 2021/0118233 A1* | 4/2021 | Duan | G06T 7/70 |
| 2021/0264669 A1* | 8/2021 | Shreve | G06K 9/00671 |
| 2021/0271882 A1* | 9/2021 | Waicberg | H04L 67/24 |

* cited by examiner

AUGMENTED REALITY SUPPORT PLATFORM

PRIORITY

The present application claims priority to U.S. Provisional Patent Application No. 62/983,141, titled AUGMENTED REALITY SUPPORT PLATFORM, filed Feb. 28, 2020, which is hereby incorporated by reference herein.

TECHNICAL FIELD

The present disclosure is directed, in general, to an augmented reality support platform that may be used, for example, by service management teams to provide real-time access to expertise to their customers, employees, and field workers.

BACKGROUND

When computer hardware or other physical equipment is not working correctly, a service call is typically placed to a service provider so that remediation can be performed by an expert. Service calls often require a follow up visit due to unforeseen issues and lack of trained experts. Follow up visits cost on average of $500 per trip, while impact for customers range from $300K to $5M per hour of downtime. Consumer apps like FaceTime™, WhatsApp™ Skype™ may be used to bridge the gap for providing visual context; but this is limited to just the expert being able to see what the field tech is showing via his mobile device. Even in these instances, help and guidance is still provided verbally, which typically results in longer and inefficient calls.

Recently, augmented reality (AR) technologies have emerged as a way enhancing real world presentations with computer-generated data. As a basic example, a camera on a smartphone can be used to capture an image of a user's environment and present that image on the smartphone's display. An AR image may then be generated by overlaying text on the image labelling certain objects or providing other objects relevant to the objects. In addition to visual enhancements, AR presentations may use other sensory modalities such as auditory, haptic, somatosensory and olfactory modalities to present relevant information to a user.

Accordingly, it is desired to leverage AR technologies to enhance how expertise related to computer hardware or other physical equipment is delivered to end users.

SUMMARY

Embodiments of the present invention address and overcome one or more of the above shortcomings and drawbacks, by providing methods, systems, and apparatuses related to an AR-based platform that simplifies how enterprises provide access to experts for their customers, employees, and field workers.

According to some embodiments, a computer-implemented method for providing device support to a user using an augmented reality (AR) interface includes establishing, by a computer system, a real-time communication session streaming audio and video between (i) a local application executing on a local user device and (ii) a remote application executing a remote user device. The method further includes transmitting, via the real-time communication session, one or more images depicting equipment captured by the local application on the local user device. Annotations to the images are received from the remote application. Each annotation is anchored to user-selected positions on the equipment. The annotations are presented on the remote user device overlaid on the equipment at the user-selected positions. The real-time communication session is used to transmit audio or video instructional information related to the equipment and referencing at least one of the annotations. The computing system stores a new session record that includes the images, the annotations, and the audio or video instructional information.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the Figures.

DETAILED DESCRIPTION

Systems, methods, and apparatuses are described herein which relate generally to an AR-based platform that simplifies how enterprises provide access to experts for their customers, employees, and field workers. This single platform simplifies access to expertise using live interaction, self-guided interactive instruction, and contextual insights. In some embodiments, technology described herein enables service management teams (e.g., field service, customer service, and IT Service teams) to use a single AR-Based Service Platform to access three unique modes of expertise assistance. First, the AR-Based Service Platform may be used to assist live interaction via a human expert resource. Second, the AR-Based Service Platform may be used to instruct an interactive instruction via self-guided ranging from a simple note, to simple instructional steps, to prebuilt 3D computer-aided design (CAD) animations. Third, the AR-Based Service Platform may provide contextual insights of data in the users field of view from objects based on Internet of Things (IoT) integrations to various data sources. Each of these three modes is described in further detail in the remainder of this disclosure. Because a single platform is utilized to support these three modes, the platform can be further enhanced with features such as analytics and dashboards of usage activity, content, and geo-location across the enterprise. Additionally, the single platform can be used to create, capture, and tag content. Tagged content may comprise, for example, images of objects, video recording with audio of the service call session, and audio to text transcription of the service call session. The tagged session content can be analyzed to gain intelligence on associations across object detection and type, incidents, and resolutions. Furthermore, the AR-Based Service Platform is described to be accessible across various types of computing devices including, without limitation, desktop computers, mobile devices, smart glasses, and drones.

Figure 1:
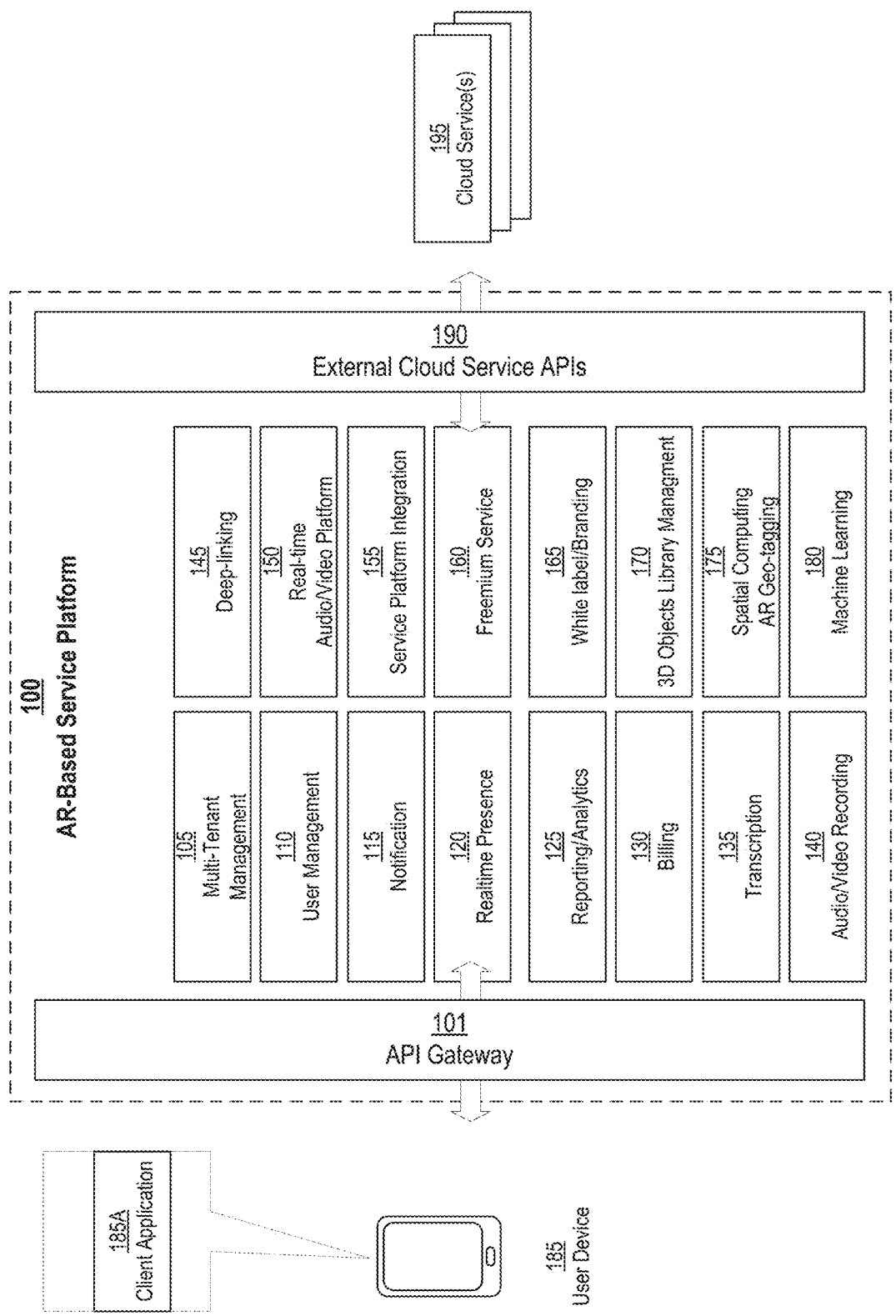
FIG. 1 provides an overview of an AR-Based Service Platform, according to some embodiments.

FIG. 1 provides an overview of an AR-Based Service Platform 100, according to some embodiments. In contrast to conventional systems, the AR-Based Service Platform 100 takes a holistic view and approach of packaging live interaction, self-guided instructional and contextual insights capabilities across a single platform and a single user experience. In the discussion that follows, the AR-Based Service Platform 100 is described in the context supporting live interaction via a human expert resource for providing real-time visual AR assistance, guidance, and compliance services.

The AR-Based Service Platform 100 is designed to manage the collection and delivery of information relate to sessions, conducted by one or more users. The term "session," as used herein, refers generally to any interactive information interchange between two or more user computing devices. The computing device can vary, depending on the type of application. For example, for a field services application, technicians connect with a remote expert for real-time guidance to solve complex or unfamiliar problems. The session in this case would be between the technician's computing device and the expert's computing device, via the AR-Based Service Platform 100. Similarly, in the customer service context, a customer may reach out to a manufacture's help center to troubleshoot a technical issue. In this context, the session would be between the customer's computing device and a computing device at the help center (again, facilitated via the AR-Based Service Platform 100).

Briefly, the User Device 185 executes a Client Application 185A. In some embodiments, the User Device 185 is a mobile device (e.g., smartphone, tablet, etc.) and the Client Application 185A is a mobile app. In other embodiments, the User Device 185 is a laptop computer and the Client Application 185A is executed within a web browser. The Client Application 185A accesses the AR-Based Service Platform 100 via an Application Programming Interface (API) Gateway 101.

In some embodiments, the API Gateway 101 provides a web based portal for accessing the platform microservices. For example, this portal may allow an administrator to manage users, review the activity of sessions, view on a visual map where activity is taking place, and view analytics of the AR-Based Service Platform 100 usage by the users.

As shown in the FIG. 1, the AR-Based Service Platform 100 comprises a plurality of independently deployable software modules referred to herein as "microservices." Each microservice provides well-defined interfaces and operations that may be accessed by other microservices. This microservices architecture is extensible and flexible for integrating or embedding application programming interfaces (APIs) as part of workflows or applications. In some embodiments, the various microservices of the AR-Based Service Platform 100 can operate as a standalone software as a service (SaaS) application. In other embodiments, the microservices integrate with one or more Cloud Services 195 offering third party workflow and applications. Thus, third party application providers can offer the functionality of the AR-Based Service Platform 100 to their customers in a manner that it is seamless for them to consume these additional capabilities. The individual microservices of the AR-Based Service Platform 100 are described in the paragraphs that follow.

The AR-Based Service Platform 100 is designed to operate on a server computing system. The Multi-Tenant Management Microservice 105 allows virtual servers hosted in a cloud infrastructure to execute multiple instances of the software associated with the different microservices. Effectively, the Multi-Tenant Management Microservice 105 allows each user to share the software application and possibly storage mediums, with mechanisms to protect data privacy. Multi-tenancy can be implemented in a variety of ways. For example, in some embodiments, all users share a database and data is separated by a foreign key or schema associated with a particular user. The Multi-Tenant Management Microservice 105 would then include functionality for storing and retrieving data based on the user's log-in or another user identifier.

The User Management Microservice 110 provides tools for managing user profiles. Example functionality provided by the User Management Microservice 110 includes user account creation, password resets, authorizing resource usage, and billing for access to the AR-Based Service Platform 100.

The Notification Microservice 115 manages notification messages sent to the User Device 185 and any other devices associated with the AR-Based Service Platform 100. Various types of messaging mechanisms known in the art may be applied by the Notification Microservice 115 including, without limitation, e-mail, short message service (SMS), and voice of internet protocol (VoIP). Various types of notification messages may be sent within this framework. For example, a user may request help from an expert in troubleshooting a hardware unit. The AR-Based Service Platform 100 may identify a qualified available expert, and send a notification to the expert's device indicating that the user is requesting assistance. Once the expert agrees to help the user, a second notification message can be sent to the user's device to inform the user that the expert is ready to assist in troubleshooting the hardware unit.

The Real-time Presence Microservice 120 monitors which users are online at any given time. Various techniques generally known in the art may be used to perform this monitoring. For example, in some embodiments, the Client Application 185A on each User Device 185 sends a "heartbeat" signal to the Real-time Presence Microservice 120 at periodic intervals (e.g., every 30 seconds). If the signal is not received from a particular user, that user is assumed to be offline. In some embodiments, more complex mechanisms may be used to determine whether the user is online, offline, busy, or away from his or her device. As explained below with reference to FIG. 3, the real-time presence information may be used to display a list of users with their respective presence status.

The Reporting/Analytics Microservice 125 generates reporting data and analytics values corresponding to sessions. This Reporting/Analytics Microservice 125 may later be queried to generate reports for a user or other administrator providing detailed information describing how, when, and why particular sessions were conducted. Additionally, the Reporting/Analytics Microservice 125 may provide an aggregated analysis of data from multiple sessions. Example data that may be generated by the Reporting/Analytics Microservice 125 include, without limitation, how many sessions were created by a particular user, and/or hardware devices that are the subject of each session, and how often experts are determined to successfully resolve a question or issue presented by a user. The Reporting/Analytics Microservice 125 may additionally provide charts or other visualizations to present the reporting data and analytics values.

In some embodiments, the Reporting/Analytics Microservice 125 is used to support an enterprise portal that details various analytics associated with the enterprise. For example, in some embodiments, this portal may display a customer view of usage, user, content, geolocation, etc. In other embodiments, key performance indicators (KPIs) are tracked across use cases and displayed in the portal. In other embodiments, the portal shows return on investment (ROI) information across base lines to show the impact of the AR-Based Service Platform 100 on the enterprise's overall operations.

In some embodiments, the AR-Based Service Platform 100 may be offered to users using a "freemium" model. As is generally understood in the art, a freemium model is one in which a product is offered free of charge and users are charged for additional features of the product. For example, in some embodiments, a freemium user may only be allowed to conduct a certain number of sessions per month, or a freemium user may only be allowed to contact certain experts or other users. The user can then pay a fee to increase the number of sessions or access a larger group of experts. In the example of FIG. 1, Freemium Service Microservice 160 manages the base functionality of the AR-Based Service Platform and keeps track of what additional features each user has purchased. The Billing Microservice 130 manages user billing information for individual user and interacts with third party platforms (e.g., PayPal™, credit card services, etc.), as necessary, to bill users for purchases.

A Transcription Microservice 135 generates text transcriptions the content recorded by the Audio/Video Recording Microservice 140. In some embodiments, Transcription Microservice 135 provides a graphical user interface (GUI) to allow for manual transcription of content. In other embodiments, the Transcription Microservice 135 utilizes machine learning to automate transcription. For example, in one embodiment, a combination of a Deep Neural Network (DNN) and a Hidden Markov Model (HMM) is used for transcription. The machine learning models may be trained, for example, using a database of manual transcriptions of data. Furthermore, in some embodiments, the Transcription Microservice 135 uses machine learning models such as Google's Vision API and AutoML Vision system to detect and classify objects in the content recorded by the Audio/Video Recording Microservice 140. For example, certain physical components in the content can be identified and stored in a database. In this way, users can later query the database for relevant content based on text or particular objects.

The transcription generated by the Transcription Microservice 135 may be indexed in a search engine for later retrieval based on keywords or phrases. In some embodiments, the transcription further includes timestamps such that show point of time during a session that a keyword or phrased was uttered. Transcription may allow for immediate "searchability" and "discoverabilty" of session content based on key words or phrases pin pointing the exact service call and point of time during a session. This can save a great deal of time versus having to search individual service call sessions. Furthermore, as noted above, in some embodiments the transcription is integrated with the video and/or audio recording of the session. This provides the ability to easily search and discover against key terms for filtering specific point in time reference across all recording sessions.

In some embodiments, the Transcription Microservice 135 automatically saves the content of the session in relevant records such as work orders, incident trouble tickets, customer cases, knowledge bases, or any systems of record for future use. This future use may include, for example, audit and/or compliance uses as well as using the context of the data to provide future resolutions pertaining to specific objects in order to resolve issues faster without consulting a live human expert.

The Audio/Video Recording Microservice 140 captures and records the content of the session automatically and saves it for future reference. For example, the recorded data may be used in completing information for work orders, incident trouble tickets, or audit/compliance purposes (e.g., maintaining service level agreements). Furthermore, the data can be stored in knowledge-bases or any systems of record for use in troubleshooting specific objects in order to resolve issues faster without consulting a live human expert. Content can be recorded using any technique known in the art, and the fidelity of the recording can vary depending factors such as the storage capabilities of the computing system supporting AR-Based Service Platform 100. For example, in one embodiment, all content is recorded in high-definition. In other embodiments, certain content may be flagged for recording in high-definition, while other content is recorded in low-definition. For example, an expert may indicate that certain content presents a novel troubleshooting scenario or that the content is important for compliance purposes; in these situations, content will be recorded in high-definition.

In some embodiments, the Transcription Microservice 135 and the Audio/Video Recording Microservice 140 may provide tagging functionality. For example, in one embodiment, users can tag images, objects, and recordings to create recognition of objects associating prior service sessions. A user may also add a tag describing any resolutions to those objects.

In some embodiments, the Transcription Microservice 135 and the Audio/Video Recording Microservice 140 integrate directly with one or more Cloud Services 195 that create and manage digital workflows. For example, in one embodiment all content captured, recorded, and transcribed during a session is automatically stored in corresponding Field Service Management (FSM), Customer Service Management (CSM) and IT Service Management (ITSM) applications offered by the ServiceNow™ platform. The other microservices can also integrate with these types of platforms to enhance the overall functionality of the AR-Based Service Platform 100. To continue with the previous example, the Reporting/Analytics Microservice 125 may incorporate the analytic data of the AR-Based Service Platform 100 with ServiceNow™ analytic data.

The Deep-linking Microservice 145 allows deep-linking into specific content stored by the AR-Based Service Platform 100. As is generally understood in the art, deep-linking refers to using a hyperlink that includes an identifier allowing retrieval of specific content without requiring searching. Once generated, the hyperlink can be transmitted (e.g., via SMS, e-mail, etc.) as a means of sharing content between users. In the context of the present application, a deep-link may be used, for example to initiate a call or provide a guest link invite. Furthermore, deep-linking can allow the retrieval of content such as audio or video of troubleshooting sessions, transcriptions, etc. The Deep-linking Microservice 145 includes functionality for translating an identifier in a hyperlink to specific content. In some embodiments, the Deep-linking Microservice 145 may additionally support uniform resource identifiers that launch a mobile app on the User Device 185. For example, a deep-link to a help video may be configured such that it automatically opens the YouTube™ app on the User Device 185 when the deep-link is activated by the user.

The Real-time Audio/Video Platform 150 facilitates real-time streaming of audio and video data. In general, any technique known in the art may be used for implementing real-time communication. For example, in some embodiments, the Real-time Audio/Video Platform 150 utilizes libraries implementing WebRTC (Web Real-Time Communication) to manage data, audio, and video transfers between devices. In other embodiments, the Real-time Audio/Video Platform 150 interfaces with a Cloud Service 190 to manage real-time communication.

In this example of FIG. 1 a Service Platform Integration Microservice 155 integrates with a third party SaaS provider (e.g., ServiceNow™) to centrally host the software of the AR-Based Service Platform 100. In some embodiments, the Service Platform Integration Microservice 155 manages functionality with importing relevant data to the SaaS provider (e.g., via upload of database tables). Additionally, the Service Platform Integration Microservice 155 may provide a GUI that allows administrators to configure different options provided by the SaaS provider. For example, the Service Platform Integration Microservice 155 may be used to select different authentication processes that should be applied to users.

The White label/Branding Microservice 165 manages white labelling of the AR-Based Service Platform 100. As is generally understood in the art, white labelling of a product allows the product to be sold and rebranded under another company's brand. The White label/Branding Microservice 165 may be used, for example, to store branding graphics and other data required to produce a branded version of the AR-Based Service Platform 100. Additionally, the White label/Branding Microservice 165 may include functionality for placing the branding graphics in the GUI of the AR-Based Service Platform 100. For example, in some embodiments, a reseller may be assigned a certain uniform resource locator (URL). When the AR-Based Service Platform 100 is accessed via that URL, the White label/Branding Microservice 165 returns GUIs that provide the content of the White label/Branding Microservice 165 with the reseller's branding. Furthermore, as another alternative, a service provider may embed the APIs of the AR-Based Service Platform 100 completely as part of their own application or service experience.

In some embodiments, the AR-Based Service Platform 100 may be used to provide interactive instructions via self-guided ranging from a simple note, to simple instructional steps, to prebuilt 3D CAD animations. The 3D Objects Library Management Microservice 170 coordinates access to and use of objects used to generate the animations. These objects may include, without limitation, wireframe, surface, and solid models of selected hardware components. In some embodiments, the AR-Based Service Platform 100 allows user to upload their own 3D models and add annotations that can then be used for various purposes.

In some embodiments, the 3D Objects Library Management Microservice 170 supports the generation of 3D spatial meshes based on images captured by the User Device 185 For example, a 3D spatial mesh could be layered over real world 3D objects as a guidance system. Furthermore, an alert system may be employed that recognizes and tracks the percentage of the 3D spatial mesh that has been detected and, if it falls below a threshold, the system can alert the user to move their mobile devices so enough of 3D spatial mesh visual is detected. This would improve the AR annotations on the 3D spatial mesh. In some embodiments, local and remote users can annotate (e.g., drawing, arrow, sphere, text) and anchor data on the 3D spatial mesh. Each user's view can be independent; for example, the 3D spatial mesh to be turned on/off by the local or remote user as desired. As an alternative to using 3D models, annotations can be overlaid over real-world view captured, for example, via a camera on the User Device 185. AR techniques are generally known in the art and, thus, are not described herein in detail.

The Spatial Computing AR Geo-Tagging Microservice 175 provides functionality for determining the geo-location (e.g., longitude/latitude) of where the AR session took place. This information can then be shown to users in a map format to highlight where AR sessions took place. In some embodiments, additional information may be depicted on the map such as a brief description of the device(s) discussed during each session. The map may also be interactive. For example, in some embodiments, users can click on a particular location on the map to retrieve the audio, video, and transcription of the corresponding session.

In some embodiments, the Client Application 185A allows an end user in the field to use the AR-Based Service Platform 100 in two connectivity modes: offline and online. The offline mode is designed for situations where the user has low or no bandwidth. In this mode, the user in the field can point the back camera of User Device 185 (not shown in FIG. 1) to capture a real-world view. The user can then use the Client Application 185A to make AR annotations on top of the real-world view. The Client Application 185A then stores the annotated images either locally or on a remote cloud-based storage service. For example, in one embodiment, the Cloud Services 190 include Amazon Simple Storage Service™ (Amazon S3). In this case, the Client Application 185A sends the annotated images to Amazon S3 either directly or via one or more of the platform microservices shown in FIG. 1.

In the connected mode, the Client Application 185A allows an end user to reach out to an expert who can be another user in the field or an expert working a designated service location (e.g., a back office). In this scenario, images captured by the camera of the User Device 185 are streamed via the Client Application 185A to the other user. The other user is assumed to also be operating a device that executes an application that allows access to the AR-Based Service Platform 100. Once connected, either user can make annotations on the images and the annotated images are stored as discussed above. Additionally, the Audio/Video Recording Microservice 140 may be used to record any audio spoken by the users while performing the annotations, as well as the video stream showing how the annotations were applied.

Figure 6:
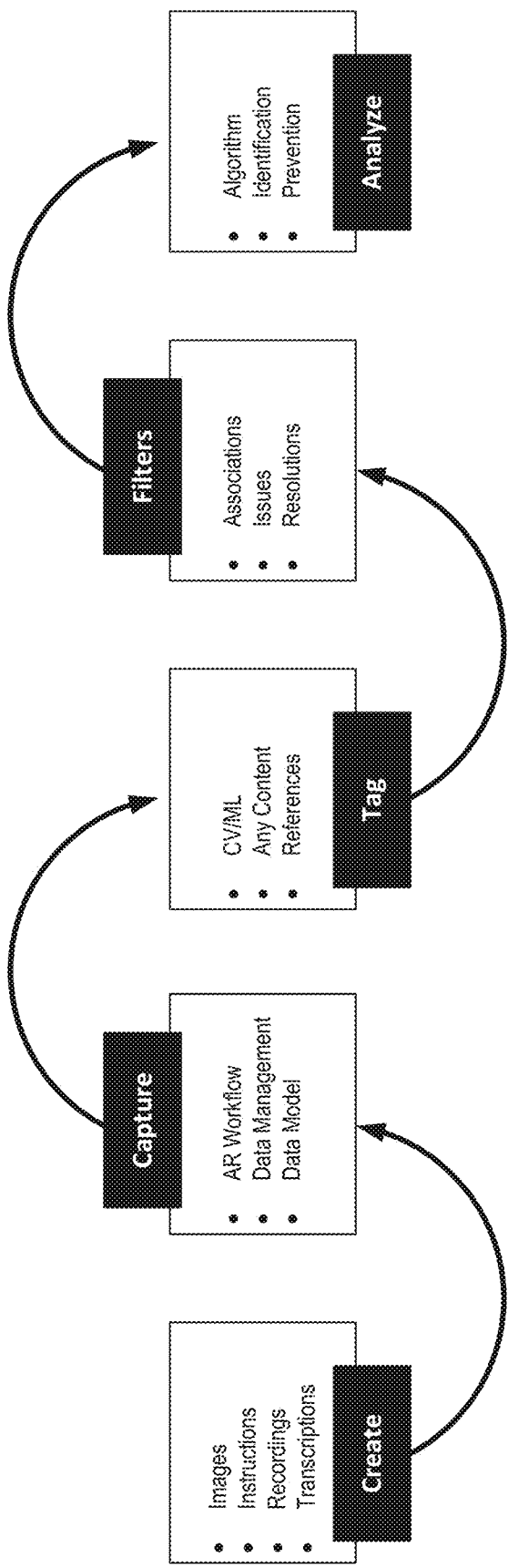
FIG. 6 illustrates how an AR-Based Service Platform can use session data to further develop its knowledge base, according to some embodiments.

The AR-Based Service Platform 100 additionally includes a Machine Learning Microservice 180 that offers access to various machine learning algorithms. Such algorithms may be employed, for example, to create automated responses to user inquiries based on past session data. For example, computer vision and machine learning algorithms may be used to identify objects and patterns in images or video streams based on prior resolutions. In turn, the objects and patterns can be used to help identify and resolve problems. For example, the AR-Based Service Platform 100 may allow users to create capture, tag, filter, and analyze content. As discussed above, the AR-Based Service Platform 100 can create content including images, video/audio recording and audio transcriptions, which are then captured into multiple sources that may be accessed to a user (e.g., an admin user portal). The images may be tagged using machine learning (ML) and/or computer vision image recognition, and the recordings can be auto tagged by looking at the various objects in the images. Furthermore, by extracting various model numbers, versions and other details from the image may be stored with the other session data. In some embodiments, tags for the audio transcription can be automatically generated through the service session calls. Filters can be created based on parameters of tagged objects, incidents, and resolutions. Then analysis can be performed uncovering patterns of associations. FIG. 6 illustrates a conceptual overview of these features of the AR-Based Service Platform 100.

In some embodiments, AR-Based Service Platform 100 additionally includes an AR workflow executed during a session. This AR workflow will be used across the multiple modalities or applications of the AR-Based Service Platform 100. It may allow content to be triggered based on, for example, capture, condition, and commerce parameters. For example, a user taking a picture of the screen may instantly trigger saving to multiple systems such as originating service ticket, admin user portal, knowledge base, email, text message, etc. For conditional parameters, rules-based triggers may be implemented (e.g., using "if" or "then" conditions), such that a set of instructions can be served up to a field tech based on a condition of a device they are viewing with the Client Application 185A (e.g., a utility meter gauge) or if the same item on the device is not working. Based on the rule, this can then trigger a series of notifications to various systems and people based on predefined workflow rules. Regarding commerce parameters, in some embodiments, the AR-Based Service Platform 100 allows user or remote personnel to make a purchase associated with the object recognized within the service session. This could be done within AR-Based Service Platform 100 or by connecting via APIs to a customer's commerce platform.

Aside from supporting a live interaction via human expert resources, the AR-Based Service Platform 100 may be used for other applications in other embodiments. For example in some embodiments, the AR-Based Service Platform 100 facilitates interactive AR instruction via self-guided simple notes and simple instructions which users can create on their own. In other embodiments, the AR-Based Service Platform 100 may be used to provide contextual insights via data displayed with AR in a user's field of view, from objects and IoT integrations to various third party data sources. In some embodiments, the AR-Based Service Platform 100 has reader capabilities to read IoT data being displayed via the Client Application 185A from, for example, bar codes, QR codes, and RFID tags. Within the field of view, a field user may have the ability to select or click on data in the field of view, such as a service ticket, open the service case, and edit or update and save the service record use. Additionally, the AR-Based Service Platform 100 may supply workflow that can be used by the field user to perform functions such as transact or notify personnel leveraged from the predefined/pre-configured "wrappers".

In some embodiments, experts or other users can create AR presentations in a manner that is similar to creating presentations in Microsoft's PowerPoint™. For example, the user may list each annotation with the AR-Based Service Platform 100. Then, the AR-Based Service Platform 100 may provide the ability to drag/drop to arrange the sequence for the annotations. In some embodiments, the user can select how transitions between annotations are executed (e.g., click to move to a timer value). Additionally, the AR-Based Service Platform 100 may provide ability to add text against each annotation. This can be shown, for example, anchored next to the annotation. In some embodiments, the user is also provided with the ability to add "voice over" against each annotation. This can be saved and played when transition to this annotation happens. There may also be an option to replay if the user wants to listen to it again. For custom annotations, the AR-Based Service Platform 100 may provide the ability to put dynamic external content (e.g., JSON, URL, 3D models, etc.) in the presentation.

In some embodiments, annotations and other AR content from presentations can be published to the cloud for later retrieval by other users using various techniques. This retrieval can be static or dynamic in nature. For static retrieval, the AR content can be linked to places (e.g., a particular cage in a datacenter) or a particular geolocation (e.g., within a certain meter radius of a particular latitude and longitude). For dynamic retrieval, AR content can be linked to objects (e.g., a rack or server in any cage of a data center) or a marker (e.g., a matrix code) that the user needs to match. In some embodiments, a third party service such as Placenote™ is used to manage delivery of AR content. Non-AR content can be retrieved from the AR-Based Service Platform 100, for example, using a REST API.

Figure 2:
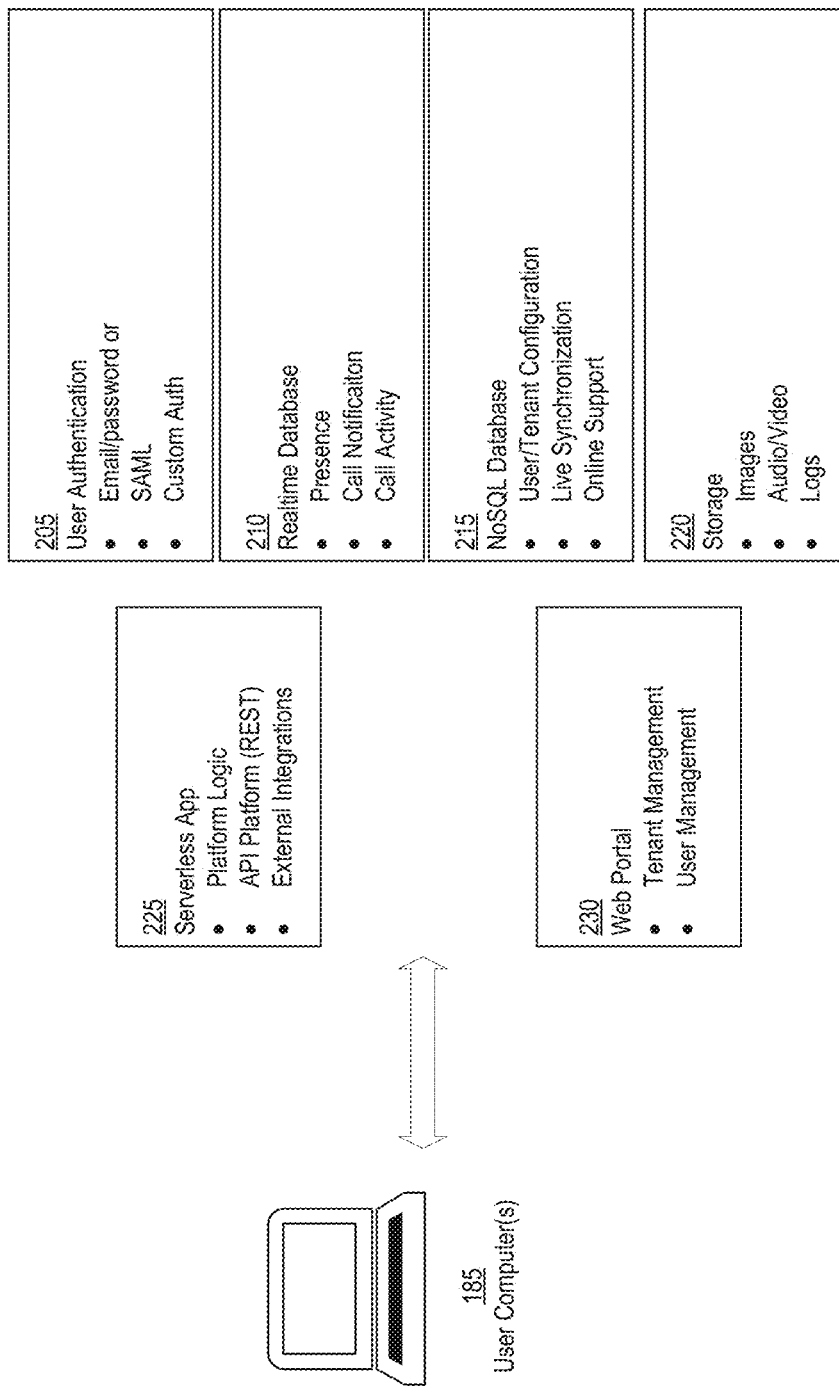
FIG. 2 provides an overview of how the AR-Based Service Platform can be deployed in a cloud-based computing environment, according to some embodiments.

FIG. 2 provides an overview of how the AR-Based Service Platform 100 can be deployed in a cloud-based computing environment, according to some embodiments. In this example, the core logic of the AR-Based Service Platform 100 are executed as a Serverless App 225. As is generally understood in the art, a serverless app is executed on a cloud-based computing environment with backend services provided on an as-used basis. This allows the provider of the AR-Based Service Platform 100 to be billed on usage rather than based on a fixed amount of bandwidth or on the number of servers used by the microservices. In the example of FIG. 1, the Serverless App 225 provides an API for accessing the microservices using Representational State Transfer or "REST"). Any external integrations may also be supported in the Serverless App 225. A Web Portal 230 provides tenant management (allowing execution of multiple instances of the microservices) and management of user accounts. A User Authentication Service 205 manages authentication on the cloud-based server using, for example, an email/password system, SAML, or a custom authentication scheme selection by the administrator of the AR-Based Service Platform 100.

Continuing with the example of FIG. 2, the deployment includes three levels of storage. A Real-time Database Service 210 performs functionality such as maintaining user presence status, managing call notifications, and recording audio and video during a call. A NonSQL Database Service 215 manages configuration data associated with the Web Portal 230 including user/tenant configuration data. Live synchronization techniques generally known in the art may be used to capture changes to the data as they occur. Other data such as online support documents may also be stored in the NonSQL Database Service 215. The other Storage Service 220 provides long term storage of data such as image, audio/video, logs etc., generated by sessions conducted over the AR-Based Service Platform 100. Each of the storage services 210, 215, 220 may be employed directly within the Serverless App 225 or external third-party services can be used. For example, in some embodiments, the NonSQL Database Service 215 is implemented with a third party cloud-native NoSQL document databases such as Cloud Firestore™.

Figure 3:
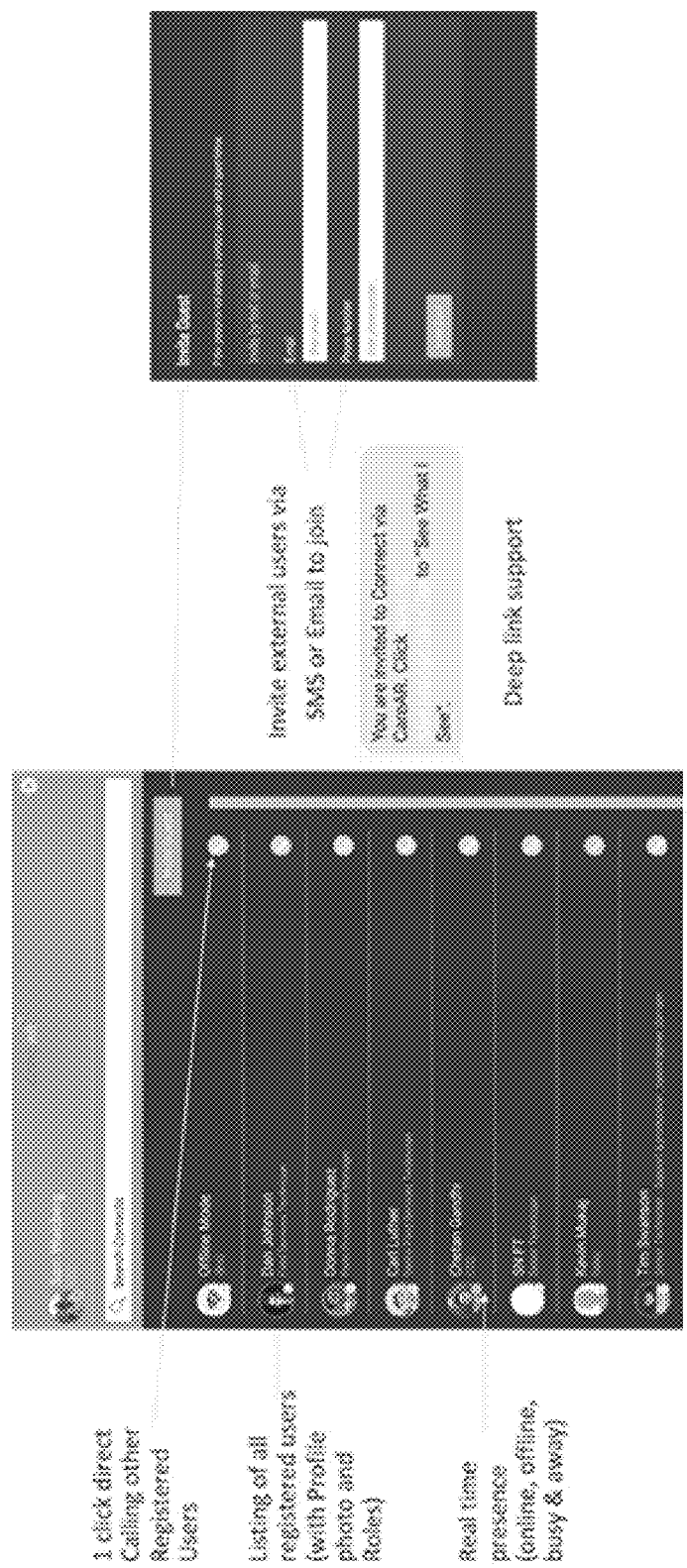
FIG. 3 shows a contact user interface that may be used as part of the client application provided to end users.

FIG. 3 shows a contact user interface that may be used as part of the client application provided to end users, according to some embodiments. The contact user interface provides calling and contact functionality to the user. For example, in some embodiments, the contact user interface displays all registered users, their real-time presence or availability (e.g., on-line, offline, busy, away, etc.) and ability to contact them. In the example of FIG. 3, a "click to call" button is displayed next to each registered user. Activation of this button causes the user's device to make a call to the selected registered user. In some embodiments, the contact user interface provides the ability to call multiple registered users on a single call. As shown on the right hand side of FIG. 3, individuals not currently registered (or existing on the user's contact list) can be invited to the system through various means including, without limitation, SMS or e-mail. For example, in some embodiments, an individual may be sent a "deep link" that direct the individual to a web page for registration. Further, in various embodiments, one or more than one registered users or non-registered users can be invited to join any given session.

Figure 4:
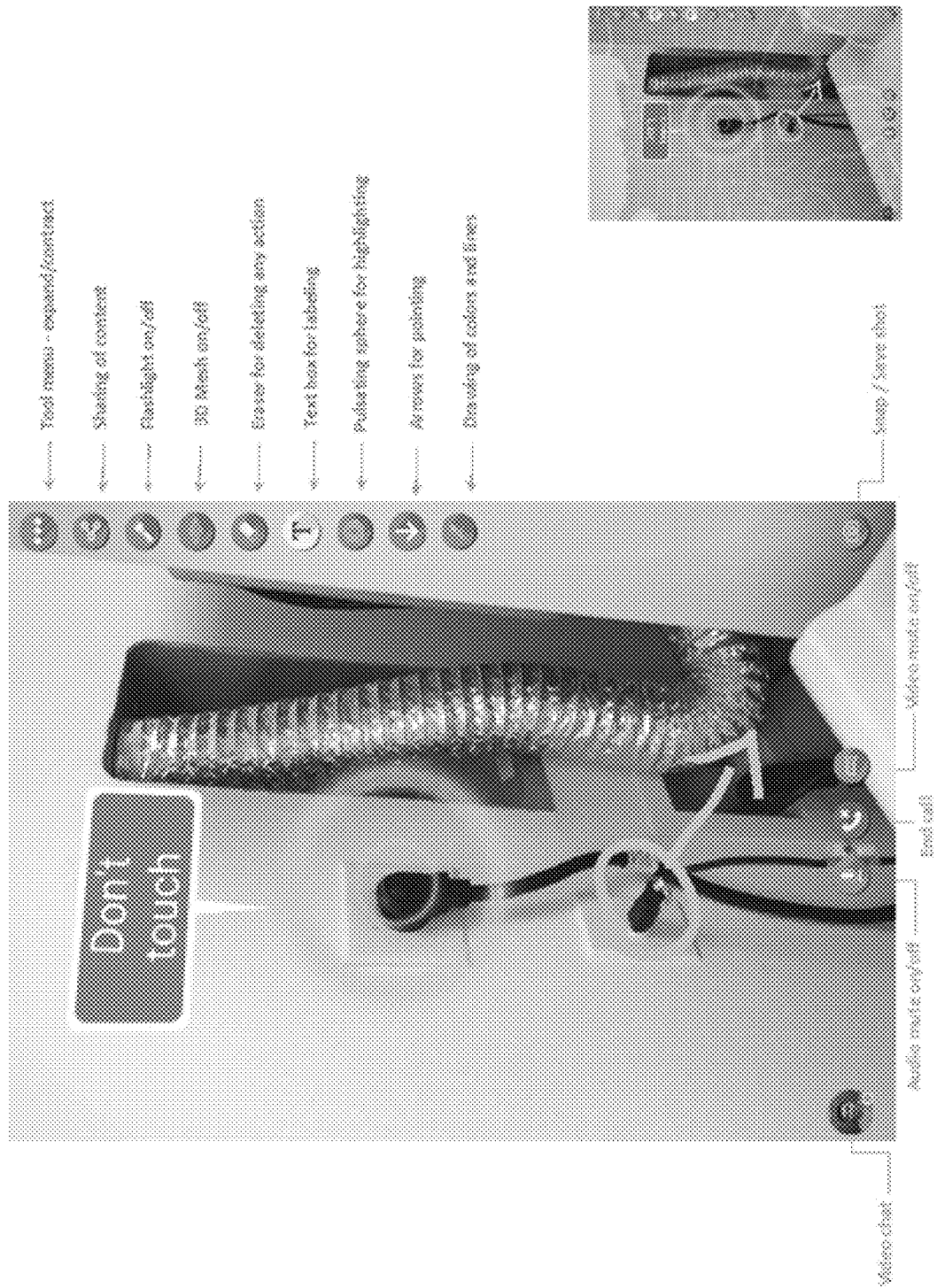
FIG. 4 illustrates AR annotation tools that may be used during a call, according to some embodiment.

FIG. 4 illustrates AR annotation tools that may be used during a call, according to some embodiment. Various types of annotations may be employed as shown in FIG. 4 including, without limitation, drawing using different colors and line thickness; arrows for pointing; pulsating spheres for highlighting; and text boxes for labeling. One or more tools may be provided for deletion of annotations (e.g., an eraser). Additionally, tools may be provided that allow the remote user to control features of the local user's device. Consider the example of a local field technician working with a remote expert to diagnosis a hardware issue. A tool may be provided that allows the remote expert to turn the flashlight on the field technician's device on or off. The tools may also allow users to share images remotely and allow annotations on the images, as well as take snapshot and save it locally and in the cloud. Finally, the call interface may include other elements that allow the local user to turn the microphone (audio) mute on or off; turn the camera (video) mute on or off; or disconnect the call.

Figure 5:
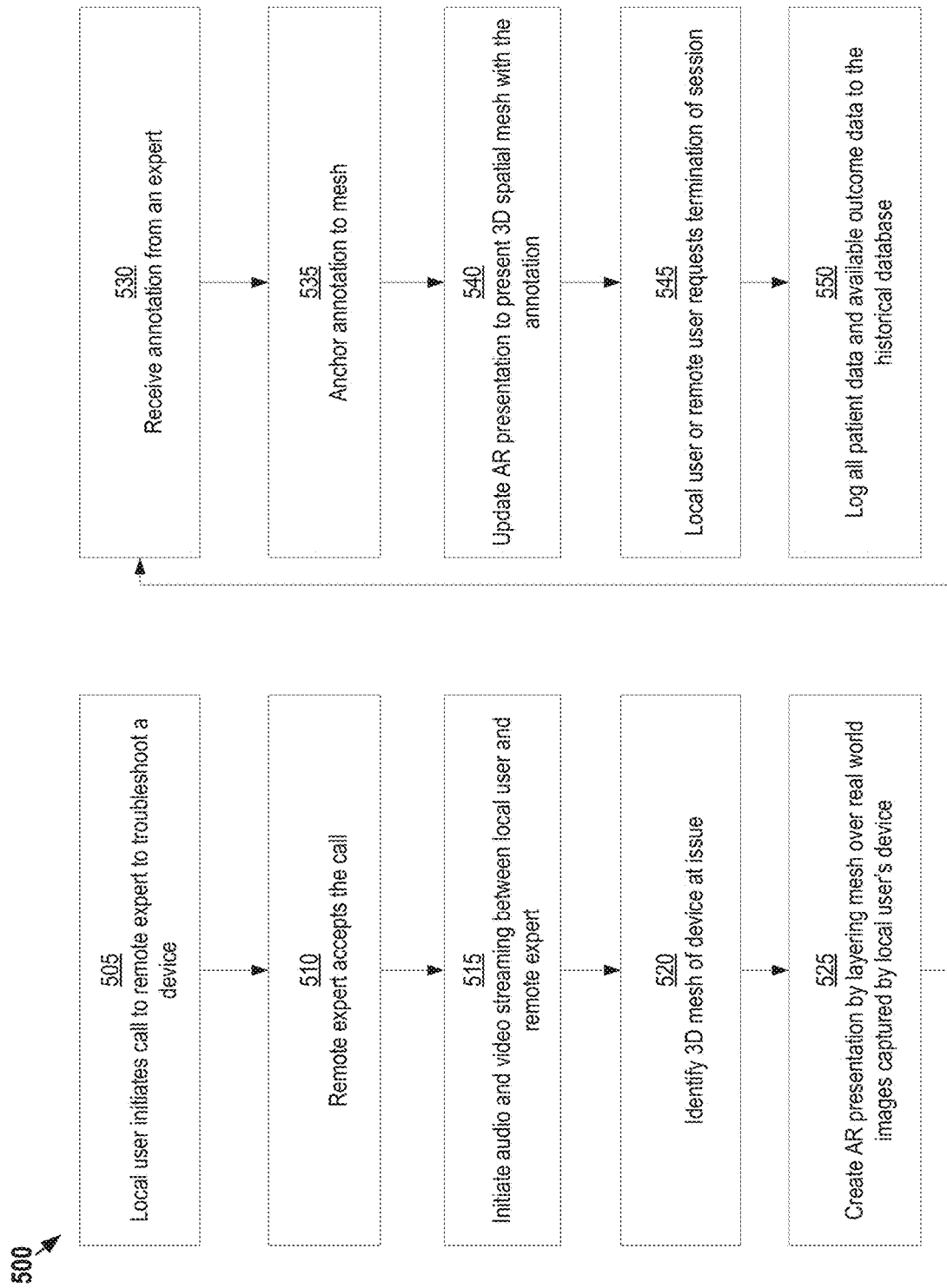
FIG. 5 details an example method for providing an interactive troubleshooting call, according to some embodiments.

FIG. 5 details an example method 500 for providing an interactive troubleshooting call, according to some embodiments. Starting at step 505, a local user initiates a call to a remote expert via an application on the user's device. For example, in some embodiments, the user may use an interface similar to the one shown in FIG. 3 to select one or more remote users to initiate a session. For the purposes of this example, it will be assumed that the session is conducted between a single local user and a single remote user. However, in other embodiments, the AR-Based Service Platform may allow more than two users to simultaneously communicate via a session.

Continuing with reference to FIG. 5, the remote user (referred to as an expert in this example) accepts the call at step 510. Upon acceptance, the AR-Based Service Platform initiates audio and video streaming between the local user and the expert at step 515. More specifically, the local user points the camera of the user's device at the device that requires troubleshooting. The captured video image is streamed in real-time to the expert. While the session is on-going, the audio and video of the session are recorded by the AR-Based Service Platform. In one embodiment, any of the users in the session can initiate a "freeze mode" that freezes the video being captured by the local user device for some or all of the participants in the session. This could allow the users to focus on a particular item of interest, for example. A 3D spatial mesh of the device at issue is identified at step 520. Various techniques may be used to identify the relevant mesh. In some embodiments, the local user or expert may manually identify the relevant mesh. In other embodiments, the AR-Based Service Platform may automatically identify the relevant mesh. For example, the AR-Based Service Platform may automatically detect the device within the captured video stream and lookup the corresponding mesh via a database search. Alternatively, the AR-Based Service Platform may detect words spoken during the session to identify the device and, based on that information, retrieve the relevant mesh from a database. Once retrieved, at step 525 an AR presentation is created where the mesh is layered over the real world image of the device as captured by the user application and streamed to the expert.

An annotation is received from the expert at step 530. In some embodiments, meta information is sent over a data channel that allows remote user to annotate (drawing, arrow, sphere, text) while not interfering with the video and audio presentation of the call. This meta information may include, for example, a selected anchor point or control point for the annotation, text to be displayed, etc. In some embodiments, the data channel is implemented in WebRTC as a RTC-DataChannel. As is generally understood in the art, RTC-DataChannels are bidirectional network channels which can be used for peer-to-peer transfers of arbitrary data. They work in conjunction with other WebRTC constructs to transmit real-time data that is not audiovisual. In various embodiments, the annotations can be received with respect to the streamed video or a particular image from the streamed video (e.g., when one of the session participants has initiated the freeze mode and has frozen the video at a particular image).

The annotation is anchored on the spatial mesh at step 535. Various techniques may be applied for anchoring of AR annotations fixed in space. For example, in some embodiments, the starting point of the annotation is ray casted and the rest of the drawing is done on the plane of the image. Arrows can be anchored at the first point selected by the user. Then as the user drags the anchor point in a direction, an arrow is extended in that direction. Similarly, spheres can be anchored based on, for example, the center point of the sphere and the user can drag to resize the sphere. Text boxes can be anchored based on, for example, one of the corners and the text font is resized based on length of text. In some embodiments, a pre-defined distance (e.g., a certain number of pixels) may be maintained from the mesh and anchor point to allow for readability of the annotation. In some embodiments, different colors are used to show annotations that are occluded by other real 3D objects. In some embodiments, the size of arrow, sphere and text is dynamically set based on distance from the user viewing the screen. In some embodiments, the GUI may allow the user to take a snapshot of annotated interface for future reference. At step 540 the AR presentation displayed on the user application and video stream are each updated to present the 3D spatial mesh with the annotation. Optionally either user can interact with his respective display of the AR presentation to hide the mesh from view, leaving only the display of the real-world image and the annotations.

At step 545, either the local user or expert requests that the session be terminated. For example, as shown in FIG. 4, one or more buttons may be displayed at the bottom of the user's interface that allows the user to request termination of the session. Finally, at step 550, the audio and video from the session is transcribed and indexed for later retrieval, for example, via a search engine. Additionally, the transcribed session can be used for other purposes such as training machine learning models to automate the process of assisting users. For example, in some embodiments, a "virtual expert" may be employed that interacts with a user to provide annotations and advice on how to resolve device issues.

The embodiments of the present disclosure may be implemented with any combination of hardware and software. For example, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program codes for providing and facilitating the mechanisms of the embodiments of the present disclosure. The article of manufacture can be included as part of a computer system or sold separately.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

The invention claimed is:

1. A computer-implemented method for providing device support to a user using an AR interface, the method comprising:

establishing, by a computer system, a real-time communication session streaming audio and video between (i) a local application executing on a local user device and (ii) a remote application executing a remote user device;

transmitting, via the real-time communication session, one or more images depicting equipment captured by the local application on the local user device;

identifying, by the computer system, a 3D mesh for the equipment based on contents of the real-time communication session streaming audio and the video;

overlaying, by the computer system, the 3D mesh over the equipment when the one or more images are displayed on the local application and the remote application;

receiving one or more annotations to the one or more images from the remote application, wherein each of the one or more annotations is anchored to a user-selected position on the equipment anchored on the 3D mesh;

presenting the one or more annotations on the remote user device overlaid on the equipment at each of the user-selected positions;

transmitting, via the real-time communication session, audio or video instructional information related to the equipment and referencing at least one of the one or more annotations; and storing, by the computing system, a new session record comprising the one or more images, the one or more annotations, and the audio or video instructional information.

2. The method of claim 1, further comprising:
transcribing, by the computing system, the audio or video instructional information to yield a transcription; and
storing the transcription in the new session record.

3. The method of claim 2, further comprising:
indexing the new session record to allow retrieval of the new session record via a search engine using one or more keywords included in the transcription.

4. The method of claim 1, wherein the one or more annotations to the one or more images are anchored at points on the 3D mesh.

5. The method of claim 1, further comprising:
removing the 3D mesh in response to a request received from the local application or the remote application.

6. The method of claim 1, further comprising:
activating a light source on the local user device in response to a command received via the remote application.

7. The method of claim 1, wherein the one or more annotations comprise at least one of one or more arrows directed at elements of the equipment, text, or one or more pulsating spheres.

8. The method of claim 1, wherein the real-time communication session is established in response to selection of a remote user in a user listing displayed in the local application on the local user device.

9. The method of claim 8, wherein the user listing comprises a plurality of user identifiers and a presence indicator for each of the plurality of user identifiers.

10. The method of claim 9, wherein the presence indicator specifies whether a corresponding user is online or offline.

11. A computer system for providing device support to a user using an AR interface, the computer system comprising:
a processor; and
a memory coupled to the processor, the memory storing instructions that, when executed by the processor, cause the computer system to:
establish a real-time communication session for streaming audio and video with a local application executing on a local user device;
receive, via the real-time communication session, one or more images depicting equipment captured by the local application on the local user device;
identify a 3D mesh for the equipment based on contents of the real-time communication session streaming audio and the video;
overlay the 3D mesh over the equipment when the one or more images are displayed on the local application and the remote application;
receive one or more annotations to the one or more images, wherein each of the one or more annotations is anchored to a user-selected position on the equipment anchored on the 3D mesh;
transmit, via the real-time communication session, the one or more annotations for presentation on the remote user device overlaid on the equipment at each of the user-selected positions;
transmit, via the real-time communication session, audio or video instructional information related to the equipment and referencing at least one of the one or more annotations; and
store a new session record comprising the one or more images, the one or more annotations, and the audio or video instructional information.

12. The computer system of claim 11, wherein the memory stores further instructions that, when executed by the processor, cause the computer system to:
transcribe the audio or video instructional information to yield a transcription; and
store the transcription in the new session record.

13. The computer system of claim 12, wherein the memory stores further instructions that, when executed by the processor, cause the computer system to:
index the new session record to allow retrieval of the new session record via a search engine using one or more keywords included in the transcription.

14. The computer system of claim 11, wherein the one or more annotations to the one or more images are anchored at points on the 3D mesh.

15. The computer system of claim 11, wherein the memory stores further instructions that, when executed by the processor, cause the computer system to:
remove the 3D mesh in response to a request received from the local application.

16. The computer system of claim 11, wherein the memory stores further instructions that, when executed by the processor, cause the computer system to:
activate a light source on the local user device in response to a command received by the computer system.

17. The computer system of claim 11, wherein the one or more annotations comprise at least one of one or more arrows directed at elements of the equipment, text, or one or more pulsating spheres.

18. The computer system of claim 11, wherein the real-time communication session is established in response to selection of a remote user in a user listing displayed in the local application on the local user device.

19. The computer system of claim 18, wherein the user listing comprises a plurality of user identifiers and a presence indicator for each of the plurality of user identifiers.

20. The computer system of claim 19, wherein the presence indicator specifies whether a corresponding user is online or offline.

* * * * *